United States Patent
Ha et al.

(10) Patent No.: US 11,809,380 B2
(45) Date of Patent: Nov. 7, 2023

(54) INFORMATION SHARING METHOD, APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Zhihui Ha, Beijing (CN); Qianyi Xu, Beijing (CN); Guanghan Zhang, Beijing (CN); Jingyi Zhang, Beijing (CN); Xiaotao Nie, Beijing (CN); Zhongyang Guo, Beijing (CN); Tao Chen, Beijing (CN); Yutao Wu, Beijing (CN); Qi Zhang, Beijing (CN); Rundong Liu, Beijing (CN); Shun Huang, Beijing (CN); Minming Zhou, Beijing (CN); Gewei Yang, Beijing (CN); Jiaqi Chen, Beijing (CN); Yin Shi, Beijing (CN); Bin Zhu, Beijing (CN); Shuhan Lu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/885,895

(22) Filed: Aug. 11, 2022

(65) Prior Publication Data

US 2022/0391354 A1    Dec. 8, 2022

Related U.S. Application Data

(63) Continuation of application No. PCT/CN2021/089213, filed on Apr. 23, 2021.

(30) Foreign Application Priority Data

Apr. 30, 2020  (CN) .......................... 202010366929.1

(51) Int. Cl.
G06F 16/176    (2019.01)
G06F 16/182    (2019.01)
H04L 67/06     (2022.01)

(52) U.S. Cl.
CPC .......... G06F 16/176 (2019.01); G06F 16/182 (2019.01); H04L 67/06 (2013.01)

(58) Field of Classification Search
CPC ....... H04L 67/06; G06F 16/176; G06F 16/182
See application file for complete search history.

(56) References Cited

U.S. PATENT DOCUMENTS

2006/0259586 A1    11/2006  Wood et al.
2009/0125522 A1*   5/2009   Kodama ............. G06F 21/6254
                                                  707/999.009

(Continued)

FOREIGN PATENT DOCUMENTS

CN    103905516 A    7/2014
CN    104539611 A    4/2015
(Continued)

OTHER PUBLICATIONS

International Search Report dated Jul. 29, 2021 in International Patent Application No. PCT/CN2021/089213 (8 pages) with an English translation (2 pages).

(Continued)

*Primary Examiner* — El Hadji M Sall

(57) ABSTRACT

An information sharing method, an apparatus, an electronic device, and a storage medium are provided. The method includes: determining, in response to a file sharing request initiated by a sharing party, a file-for-sharing corresponding to the file sharing request; determining a sharing strategy for the file-for-sharing based on attribute information of the file-for-sharing; and sharing, based on the sharing strategy, the file-for-sharing within a preset sharing range.

17 Claims, 5 Drawing Sheets

(56) References Cited

U.S. PATENT DOCUMENTS

| | | | |
|---|---|---|---|
| 2014/0108506 A1 | 4/2014 | Borzycki et al. | |
| 2014/0149453 A1 | 5/2014 | Christiansen | |
| 2019/0095403 A1 | 3/2019 | Parhar et al. | |

FOREIGN PATENT DOCUMENTS

| | | | |
|---|---|---|---|
| CN | 104618499 A | 5/2015 | |
| CN | 105426148 A | 3/2016 | |
| CN | 109656893 A | 4/2019 | |
| CN | 109669924 A | 4/2019 | |
| CN | 109906593 A | 6/2019 | |
| CN | 110703966 A | 1/2020 | |
| CN | 110750197 A | 2/2020 | |

OTHER PUBLICATIONS

Office Action dated Feb. 8, 2023 in CN Application No. 202010366929.1, English translation (10 pages).
Extended European Search Report and Opinion dated Mar. 31, 2023 in European Application No. 21795949.3 (8 pages).

\* cited by examiner

INFORMATION SHARING METHOD, APPARATUS, ELECTRONIC DEVICE, AND STORAGE MEDIUM

This application is a continuation application of International Application No. PCT/CN2021/089213, filed on Apr. 23, 2021, which claims priority to Chinese Patent Application No. 202010366929.1, titled "INFORMATION SHARING METHOD, APPARATUS, ELECTRONIC DEVICE, AND STORAGE MEDIUM", filed on Apr. 30, 2020 with the China National Intellectual Property Administration, both of which are incorporated herein by reference in entireties.

FIELD

The present disclosure relates to the field of computer technologies, and in particular to a method and apparatus for sharing information, an electronic device, and a storage medium.

BACKGROUND

With the development of network technology, sharing information through the Internet has become one of important ways for information interaction among users. However, although information sharing and information interaction are supported in information sharing technologies, there still exist problems such as unsmooth or unclear displaying of shared screen, which seriously affects the effect of information sharing and the information sharing experience of the users.

SUMMARY

A method and apparatus for sharing information, an electronic device, and a storage medium are provided according to embodiments of the present disclosure.

In a first aspect, a method for sharing information is provided according to an embodiment of the present disclosure. The method includes:
  determining, in response to a file sharing request initiated by a sharing party, a file-for-sharing corresponding to the file sharing request;
  determining a sharing strategy for the file-for-sharing based on attribute information of the file-for-sharing; and
  sharing, based on the sharing strategy, the file-for-sharing within a preset sharing range.

In a second aspect, an apparatus for sharing information is further disclosed according to an embodiment of the present disclosure. The apparatus includes:
  a file-for-sharing determining module, configured to determine, in response to a file sharing request initiated by a sharing party, a file-for-sharing corresponding to the file sharing request;
  a sharing strategy determining module, configured to determine a sharing strategy for the file-for-sharing based on attribute information of the file-for-sharing; and
  a file sharing module, configured to share, based on the sharing strategy, the file-for-sharing within a preset sharing range.

In a third aspect, an electronic device is further provided according to an embodiment of the present disclosure. The electronic device includes:
  one or more processors;
  a storage device configured to store one or more programs, where
  when the one or more programs are executed by the one or more processors, the one or more processors implement the method for sharing information according to any one of the embodiments of the present disclosure.

In a fourth aspect, a storage medium with computer-executable instructions stored thereon is further provided according to an embodiment of the present disclosure. The computer-executable instructions, when being executed by a computer processor, implement the method for sharing information according to any one of the embodiments of the present disclosure.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the originals and elements are not necessarily drawn to scale.

DETAILED DESCRIPTION

Figure 1:
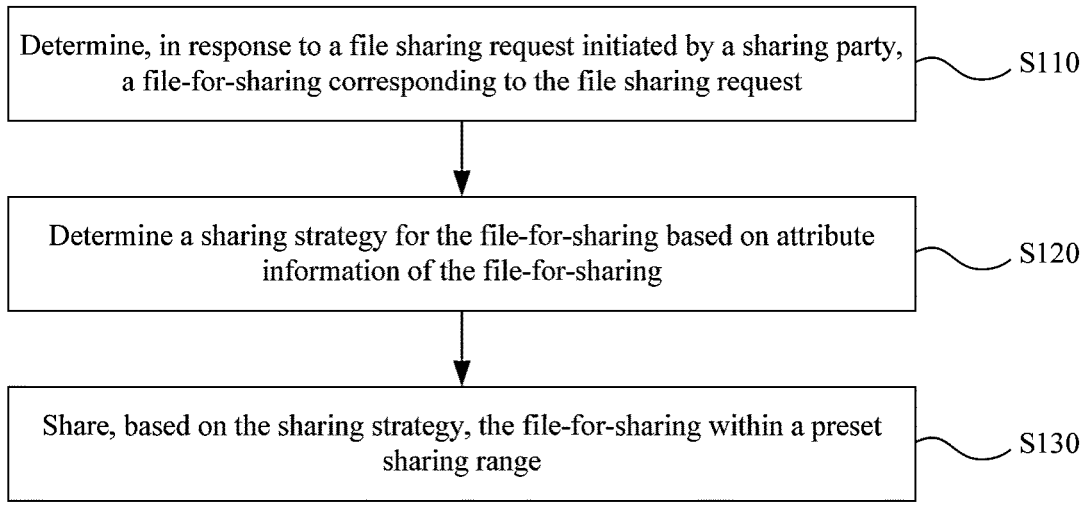
FIG. 1 is a schematic flowchart illustrating a method for sharing information according to Embodiment 1 of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

Embodiment 1

FIG. 1 is a schematic flowchart illustrating a method for sharing information according to Embodiment 1 of the present disclosure. The embodiment of the present disclosure is especially applicable for a situation where multiple users perform a presentation operation on a same file-for-sharing. The method can be executed by an apparatus for sharing information. The apparatus may be implemented in the form of software and/or hardware, and may be configured in a server to cooperate with a terminal to implement the method for sharing information according to the present disclosure. Here, the server may be a single server, or may be a server cluster that can provide one or more functions and includes multiple servers communicatively connected.

As shown in FIG. 1, the method according to the present embodiment includes S110 to S130.

In S110, in response to a file sharing request initiated by a sharing party, a file-for-sharing corresponding to the file sharing request is determined.

The sharing party can be understood as an initiator which initiates the file sharing request. The file sharing request is used to request sharing of the file-for-sharing corresponding to the file sharing request. There may be multiple ways to trigger the file sharing request, i.e., multiple sharing triggering operations. For example, a preset button in a first preset area is triggered, or a preset triggering operation is performed in a second preset area, where the first preset area and the second preset area may be set according to actual needs. The first preset area and the second preset area may be the same or different from each other. Triggering the preset button may be implemented as pressing the preset button for longer than a preset time duration or making a preset number of clicks on the preset button. The preset triggering operation may be dragging a preset marker, controlling a cursor to form a preset trajectory, or the like. In addition, the file sharing request may further be initiated through voice commands, gesture recognition or other manners.

Optionally, the file-for-sharing may include a shared document. Exemplarily, the shared document may include at least one of Jackins document, word document, Excel document, PPT (PowerPoint) document, and the like. It should be noted that the above are only examples of the file-for-sharing. Any content being shared in a form of a file falls within the protection scope of the present disclosure. The form and content of the file-for-sharing are not limited in the present disclosure.

Taking the file-for-sharing being a webpage as an example, the file sharing request may be initiated by: in response to a sharing triggering operation received from a user, presenting an interface for inputting a candidate webpage to be shared; and generating the file sharing request based on a web address input by the user on the interface for inputting the candidate webpage.

In S120, a sharing strategy for the file-for-sharing is determined based on attribute information of the file-for-sharing.

The attribute information may include a storage address. Optionally, the storage address may be a local storage address of a terminal corresponding to the sharing party, or may be a cloud storage address on a third-party server. The third-party server may be a server other than the local terminal corresponding to the sharing party. For example, in a case that the file-for-sharing is a webpage, the storage address may be a web address, and the web address may be an IP (Internet Protocol) address and/or a domain name address. It should be noted that the attribute information of the file-for-sharing includes, but is not limited to, the storage address of the file-for-sharing, and may further include, for example, the format of the file-for-sharing and/or the server carrying the file-for-sharing or the like.

In conventional information sharing technologies, all files-for-sharing are generally shared through the same sharing method, which enables only some of the files-for-sharing to be shared smoothly and clearly. Due to the variety of the files-for-sharing, the individual differences of the files-for-sharing, such as sizes of the files-for-sharing and current network conditions, result in different applicability to the sharing environment and sharing methods, which may cause the technical problems such as low smoothness or poor clarity when the file-for-sharing is shared to the shared party. Therefore, the scheme of sharing all files in a same sharing manner cannot well meet the personalized needs for sharing strategies of the files-for-sharing. In the technical solution of the embodiment of the present disclosure, the difference of the files-for-sharing is fully considered. By determining the sharing strategies for the files-for-sharing based on the attribute information of the files-for-sharing, the sharing strategies and the files-for-sharing are well matched, so that the file-for-sharing can be shared through the sharing strategy matching with the attribute information of the file-for-sharing, thus improving the smoothness in file sharing and improving the user experience in information sharing.

It can be understood that in determining the sharing strategy for the files-for-sharing based on the attribute information of the file-for-sharing, the files-for-sharing with different attribute information may correspond to different sharing strategies. Alternatively, the files-for-sharing with the same attribute information may correspond to different sharing strategies. Of course, the files-for-sharing with the same attribute information may correspond to the same sharing strategy. For example, some files-for-sharing may correspond to one sharing strategy, and some files-for-sharing may each correspond to two or more sharing strategies. In a case that the file-for-sharing may correspond to two or more sharing strategies, a sharing strategy may be selected according to the current network environment and actual needs, or may be randomly selected, or a default sharing strategy may be used. To sum up, sharing strategy to be used for the file-for-sharing may be set according to actual needs, and is not limited here. For example, the file-for-sharing may be classified into one of at least two sharing levels in advance based on the attribute information of the file-for-sharing, and a corresponding sharing strategy may be set for each of the sharing levels, so as to determine the sharing level of the file-for-sharing based on the attribute information of the file-for-sharing and determine the sharing strategy for the file-for-sharing based on the sharing level of the file-for-sharing.

In S130, the file-for-sharing is shared within a preset sharing range based on the sharing strategy.

The preset sharing range may be determined based on the sharing party and the shared party corresponding to the sharing party. Generally, the shared party that is involved in the same sharing event as the sharing party may be regarded as the shared party corresponding to the sharing party. The same sharing event may be understood as an event involved in the sharing of the same file-for-sharing. The shared party corresponding to the sharing party can also be simply understood as an object to which the file-for-sharing is shared, in addition to the sharing party. For example, the preset sharing range may be clients participating in the same multimedia conference.

The file-for-sharing may be shared within the preset sharing range based on the sharing strategy corresponding to the attribute information of the file-for-sharing. The sharing may include rendering and displaying the file-for-sharing in both a sharing window of the sharing party and a sharing window of the shared party.

In the technical solution of the embodiment of the present disclosure, the sharing strategy for the file-for-sharing is determined based on the attribute information of the file-for-sharing, and the difference between files-for-sharing is fully considered. The files-for-sharing are shared in a personalized manner based on the attribute information of the files-for-sharing. The sharing strategy is matched well with the file-for-sharing, so that the file-for-sharing can be shared through the sharing strategy matching with the attribute information of the file-for-sharing, so as to solve problems such as unsmooth or unclear shared screen caused by sharing all the files-for-sharing through a same sharing method in conventional technologies, thus realizing smooth sharing of the file-for-sharing and improving the user experience in information sharing.

Embodiment 2

Figure 2:
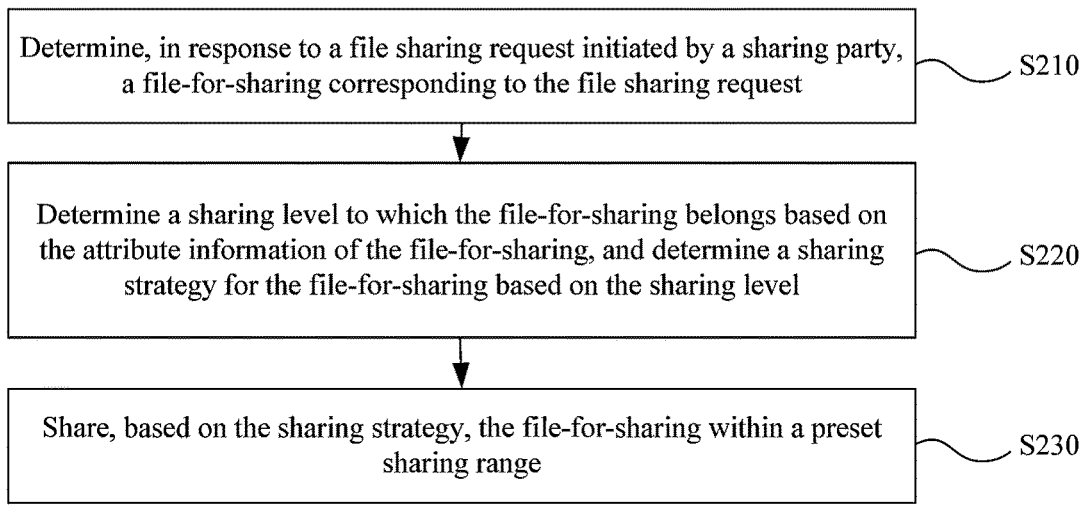
FIG. 2 is a schematic flowchart illustrating a method for sharing information according to Embodiment 2 of the present disclosure.

FIG. 2 is a schematic flowchart illustrating a method for sharing information according to Embodiment 2 of the present disclosure. The present embodiment can be combined with any of optional solutions in the foregoing embodiments. In the present embodiment, optionally, the determining a sharing strategy for the file-for-sharing based on attribute information of the file-for-sharing includes: determining a sharing level to which the file-for-sharing belongs based on the attribute information of the file-for-sharing, and determining the sharing strategy for the file-for-sharing based on the sharing level, where the attribute information includes a storage address.

As shown in FIG. 2, the method according to the present embodiment includes S210 to S230.

In S210, in response to a file sharing request initiated by a sharing party, a file-for-sharing corresponding to the file sharing request is determined.

In S220, a sharing level to which the file-for-sharing belongs is determined based on the attribute information of the file-for-sharing, and the sharing strategy for the file-for-sharing is determined based on the sharing level.

In the present embodiment of the present disclosure, the attribute information includes a storage address. Correspondingly, determining the sharing level to which the file-for-sharing belongs based on the attribute information of the file-for-sharing may include: determining the sharing level to which the file-for-sharing belongs based on the storage address of the file-for-sharing. Specifically, the storage address of the file-for-sharing may be parsed, and a server providing the file-for-sharing may be determined based on a result of the parsing. The sharing level to which the file-for-sharing belongs may be determined based on the server providing the file-for-sharing. It can be understood that correspondence between the server providing the file-for-sharing and the sharing level may be established in advance, and the sharing level to which the file-for-sharing belongs may be determined based on the server providing the file-for-sharing and the correspondence.

Optionally, determining the sharing level to which the file-for-sharing belongs based on the storage address of the file-for-sharing may further be implemented as follows: a target key field is obtained by parsing the storage address of the file-for-sharing, the target key field is matched with a preset key field, and the sharing level corresponding to the target key field is determined according to the correspondence between the preset key field and the sharing level. That is, the sharing level to which the file-for-sharing belongs to is determined. Similarly, the correspondence between preset key fields and sharing levels may be established in advance. The target key field may be a field with a preset character length at the header of the storage address.

It can be understood that, before determining the sharing level to which the file-for-sharing belongs based on the attribute information of the file-for-sharing, the file-for-sharing may be classified into at least one sharing level based on the attribute information of the file-for-sharing. Optionally, the file-for-sharing may be classified into one of at least two sharing levels based on a cooperative ability of the file-for-sharing. For example, if the file-for-sharing is sharable and the server carrying the file-for-sharing belonging to the first sharing level has a cooperative ability, the file-for-sharing may be classified into a first sharing level. If the file-for-sharing is sharable and the server carrying the file-for-sharing has no cooperative ability, the file-for-sharing may be classified into a second sharing level. Being sharable means that the file-for-sharing is allowed to be shared to the shared party by the sharing party based on the file sharing request. The cooperative ability may be understood as an ability that two or more servers implement sharing of a same file-for-sharing cooperatively.

On the basis of the above-mentioned optional solutions, the file-for-sharing belonging to the first sharing level may further be classified into one of at least two support levels based on support strength in which a sharing platform supports the file-for-sharing. The sharing strategy for the file-for-sharing may be determined based on the support level in the sharing level of the file-for-sharing. Specifically, if the file-for-sharing has the cooperative ability and the sharing platform has a first support strength for the file-for-sharing, the file-for-sharing may be classified into a first support level in the first sharing level. If the file-for-sharing has the cooperative ability and the sharing platform has a second support strength for the file-for-sharing, the file-for-sharing may be classified into a second support level in the first sharing level, where the second support strength is smaller than the first support strength.

In addition, the sharing level of the file-for-sharing may further be determined based on a file security of the filefor-sharing. The file security of the file-for-sharing may be determined based on data such as whether the server carrying the file-for-sharing is legal and/or records of complaint filed with respect to the file-for-sharing. Of course, the file security of files-for-sharing may be filtered by special technicians, and the files-for-sharing with poor file security may be classified into a blacklist. If a file sharing request for sharing a file in the blacklist is received, no sharing is performed.

It should be noted that although exemplary sharing levels are described above, in actual applications, users may determine the sharing level of the file-for-sharing based on the attributes of the file-for-sharing and actual needs. The number of the sharing levels and the basis for determining sharing level for the file-for-sharing are not limited here.

In the embodiment of the present disclosure, the sharing level to which the file-for-sharing belongs may be determined based on the attribute information of the file-for-sharing, and the sharing strategy for the file-for-sharing may be determined based on the sharing level. Different sharing levels may correspond to different sharing strategies, so as to share the file-for-sharing according to the attribute information of the file-for-sharing, thereby ensuring the smoothness and clarity of sharing.

In S230, the file-for-sharing is shared within a preset sharing range based on the sharing strategy.

In the technical solution of the embodiment of the present disclosure, the sharing level to which the file-for-sharing belongs is determined based on the attribute information of the file-for-sharing. That is, the file-for-sharing is classified based on the attribute of the file-for-sharing, a sharing level is determined, and then the sharing strategy for the file-for-sharing is determined based on the sharing level. By matching the sharing level with the sharing strategy, the personalized matching of the file-for-sharing and the sharing strategy can be realized. The file-for-sharing can be shared in a better manner, and the user experience in information sharing can be further improved.

Embodiment 3

Figure 3:
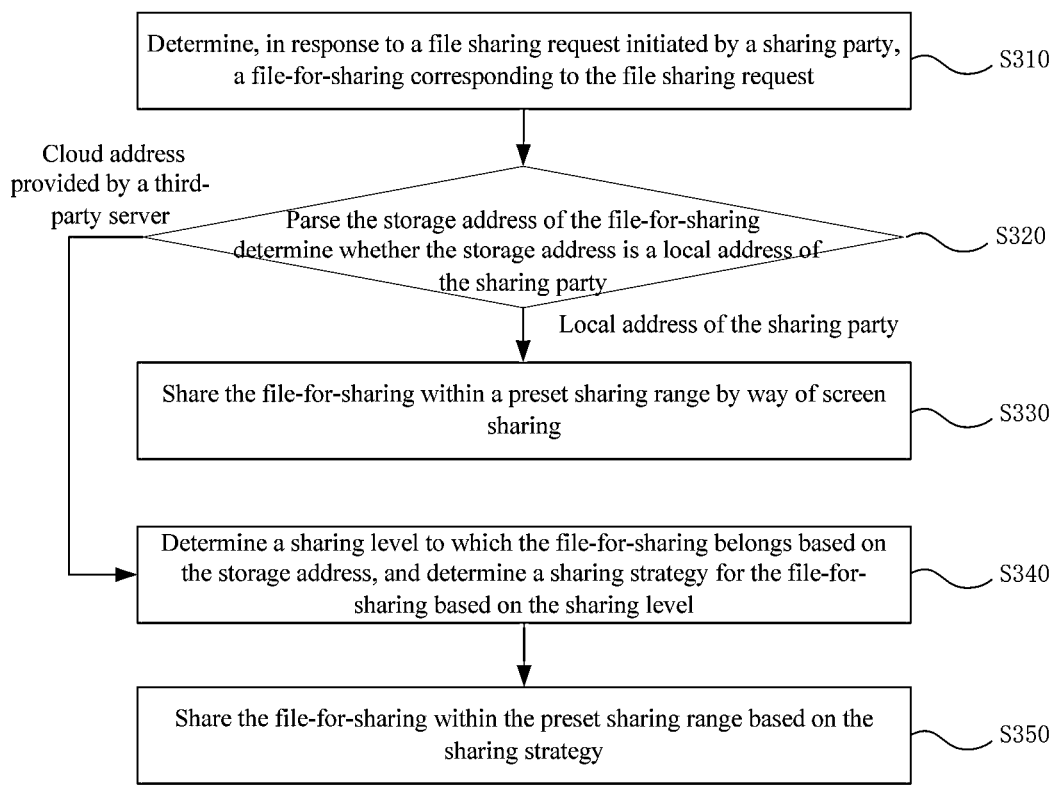
FIG. 3 is a schematic flowchart illustrating a method for sharing information according to Embodiment 3 of the present disclosure.

FIG. 3 is a schematic flowchart illustrating a method for sharing information according to Embodiment 3 of the present disclosure. The embodiment can be combined with any optional solution in the foregoing embodiments. In the present embodiment, optionally, determining the sharing level to which the file-for-sharing belongs based on the attribute information of the file-for-sharing includes: parsing the storage address of the file-for-sharing; and determining the sharing level to which the file-for-sharing belongs based on the attribute information of the file-for-sharing if the storage address is a cloud address provided by a third-party server.

Optionally, the determining a sharing strategy for the file-for-sharing based on attribute information of the file-for-sharing includes: parsing the storage address of the file-for-sharing; and if the storage address is a local address of the sharing party, sharing the file-for-sharing within a preset sharing range by way of screen sharing.

As shown in FIG. 3, the method according to the present embodiment includes S310 to S350.

In S310, in response to a file sharing request initiated by a sharing party, a file-for-sharing corresponding to the file sharing request is determined.

In S320, the storage address of the file-for-sharing is parsed, and it is determined whether the storage address is a local address of the sharing party. If the storage address is the local address of the sharing party, step S330 is performed. If the storage address is the cloud address provided by the third-party server, step S340 is performed.

In the embodiment of the present disclosure, the storage address of the file-for-sharing may be parsed. According to the parsing, the storage address may be the local address of the sharing party or the cloud address provided by the third-party server. Different sharing strategies may be assigned to the files-for-sharing with the local address and the files-for-sharing with the cloud address.

In S330, the file-for-sharing is shared within a preset sharing range by way of screen sharing.

If the storage address is the local address of the sharing party, image stream and/or video stream of contents displayed on a local screen may be captured at the sharing party, and the captured image stream and/or video stream may be sent to the shared party within the preset sharing range through network bandwidth transmission. In order to reduce the pressure of network transmission, the transmission bandwidth may be reduced by performing bit-rate compression of the image stream and/or video stream. Once receiving the compressed image stream and/or video stream, the shared party decompresses and restores the image stream and/or the video stream, so as to realize the sharing of the file-for-sharing.

In S340, a sharing level to which the file-for-sharing belongs is determined based on the storage address, and a sharing strategy for the file-for-sharing is determined based on the sharing level. Then S350 is performed.

Considering the complexity of the network environment of cloud storage, the possibility that the file-for-sharing stored at the cloud address may correspond to different servers, different attribute information of the file-for-sharing, and other factors that may affect the file-for-sharing, in the embodiment, if the storage address is the cloud address provided by the third-party server, the sharing level to which the file-for-sharing belongs may be determined according to the storage address, and the sharing strategy for the file-for-sharing may be determined based on the sharing level.

In S350, the file-for-sharing is shared within a preset sharing range based on the sharing strategy.

In the technical solutions of the embodiment of the present disclosure, whether the storage address of the file-for-sharing is the local address or the cloud address is determined by parsing the storage address of the file-for-sharing. Different sharing strategies are assigned to the file-for-sharing stored at the local address and the file-for-sharing stored at the cloud address respectively. The file-for-sharing at the local address can be shared quickly and efficiently by the way of screen sharing. More importantly, in the technical solutions of the embodiment of the present disclosure, the complexity and difference of the files-for-sharing stored at the cloud address are fully taken into account. For the file-for-sharing at the cloud address, the sharing level to which the file-for-sharing belongs is determined based on the attribute information of the file-for-sharing, the file-for-sharing at the cloud address is classified, and the sharing strategy for the file-for-sharing is determined based on the sharing level. In this way, the file-for-sharing and the sharing strategy are better matched to ensure the smoothness and clarity of information sharing.

Embodiment 4

Figure 4:
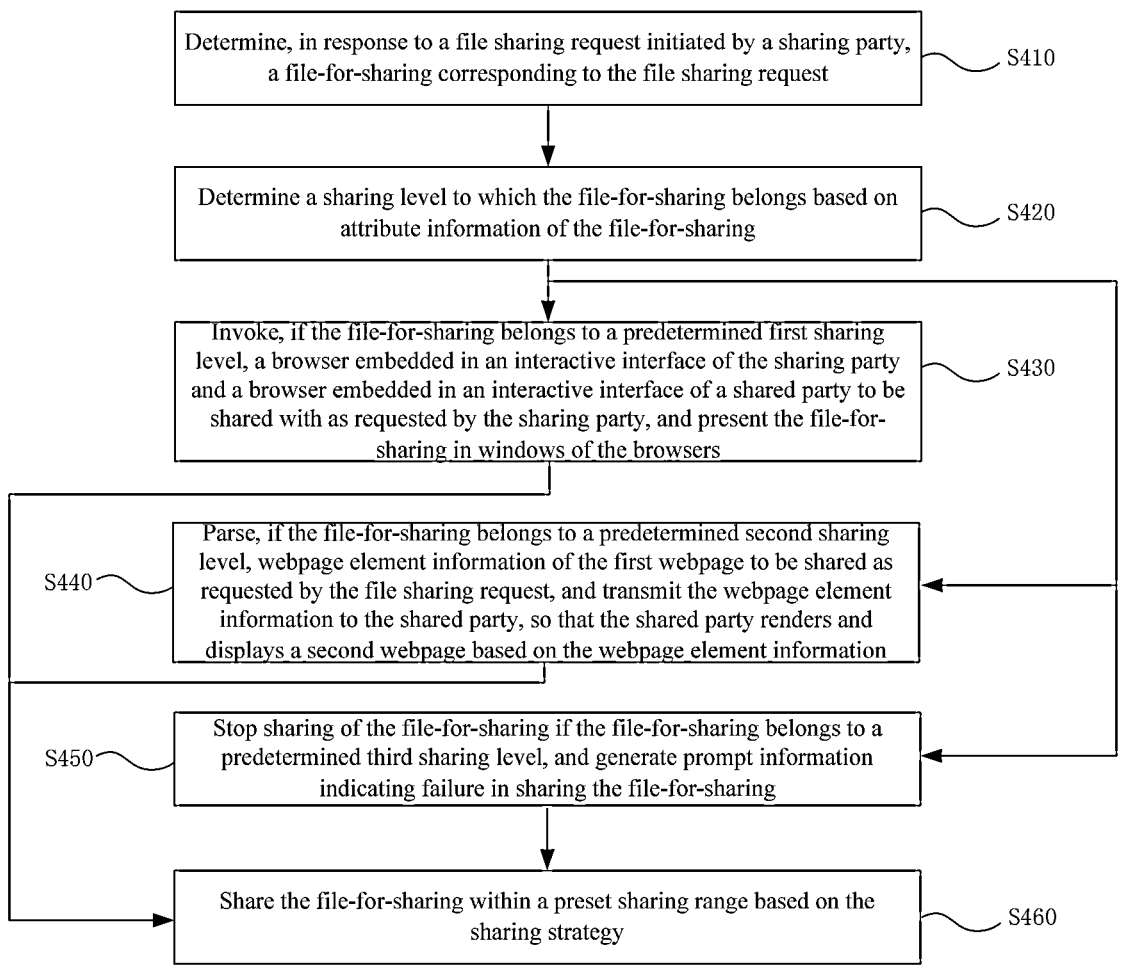
FIG. 4 is a schematic flowchart illustrating a method for sharing information according to Embodiment 4 of the present disclosure.

FIG. 4 is a schematic flowchart illustrating a method for sharing information according to Embodiment 4 of the present disclosure. The present embodiment can be combined with any optional solution in the foregoing embodiments. In the present embodiment, optionally, the determining the sharing strategy for the file-for-sharing based on the sharing level includes: in a cast that the file-for-sharing belongs to a predetermined first sharing level, invoking a browser embedded in an interactive interface of the sharing party and a browser embedded in an interactive interface of a shared party to be shared with as requested by the sharing party, and presenting the file-for-sharing in windows of the browsers.

Optionally, the file-for-sharing includes a webpage; accordingly, the determining the sharing strategy for the file-for-sharing based on the sharing level includes: if the file-for-sharing belongs to a predetermined second sharing level, parsing webpage element information of a first webpage to be shared as requested by the file sharing request, and transmitting the webpage element information to the shared party, in order that the shared party renders and displays a second webpage based on the webpage element information.

Optionally, the determining the sharing strategy for the file-for-sharing based on the sharing level includes: stopping sharing of the file-for-sharing if the file-for-sharing belongs to a predetermined third sharing level, and generating prompt information indicating failure in sharing the file-for-sharing.

As shown in FIG. 4, the method according to the present embodiment includes S410 to S460.

In S410, in response to a file sharing request initiated by a sharing party, a file-for-sharing corresponding to the file sharing request is determined.

In S420, a sharing level to which the file-for-sharing belongs is determined based on attribute information of the file-for-sharing.

In S430, if the file-for-sharing belongs to a predetermined first sharing level, a browser embedded in an interactive interface of the sharing party and a browser embedded in an interactive interface of a shared party which is requested to be shared with by the sharing party, are invoked, and the file-for-sharing is presented in windows of the browsers.

Exemplarily, the file-for-sharing belonging to the first sharing level has an attribute of being sharable, and a server carrying the file-for-sharing belonging to the first sharing level has a cooperative ability.

The file-for-sharing is determined based on a uniform resource locator, and the uniform resource locator is specified by the sharing party in the sharing window and is sent to the shared party by a server.

For example, firstly, a communication connection between the server and the sharing party is established. After the sharing party is successfully connected to the server, the uniform resource locator that is required to be shared may be specified by the sharing party in the sharing window of the local terminal. Then the uniform resource locator that the sharing party needs to share is sent by the server to the shared party. After receiving the file-for-sharing based on the uniform resource locator, the sharing party and the shared party load and parse the file-for-sharing. The file-for-sharing is displayed in the browsers on both the interactive interface of the sharing party and the interactive interface of the shared party. In this way, the content of the file-for-sharing associated with the uniform resource locator can be displayed to both the sharing party and the shared party. It should be noted that in this technical solution, it is not required to transmit all the contents on the screen and only a specific uniform resource locator is transmitted.

In addition, when the file-for-sharing needs to be switched, it is only required to re-select a uniform resource locator to be shared and open the uniform resource locator through the browsers embedded in the interactive interfaces of the sharing party and the shared party. In terms of multi-content scenarios, the switching may be performed with extremely low cost and friendly interaction.

In S440, if the file-for-sharing belongs to a predetermined second sharing level, webpage element information of a first webpage, to be shared as requested by the file sharing request, is parsed, and the webpage element information is transmitted to the shared party, in order that the shared party renders and displays a second webpage based on the webpage element information.

Exemplarily, the file-for-sharing belonging to the second sharing level may be a sharable file for which a server carrying the file-for-sharing has no cooperative ability. It should be noted that, in the embodiment of the present disclosure, being sharable means that the file-for-sharing itself is allowed to be shared, or means that a sharing application allows the file-for-sharing to be shared. Whether the file-for-sharing itself is allowed to be shared is generally determined by the server that carries the file-for-sharing. Whether the sharing application allows the file-for-sharing to be shared is generally determined by a server where the sharing application resides. Whether the file-for-sharing has the attribute of being sharable includes whether the sharing party has permission to share the file. It can be understood that the permission may be changed according to actual needs.

Parsing of the webpage element information in the first webpage may include: parsing a webpage structure of the first webpage to obtain webpage elements and rendering modes corresponding to the webpage elements, and taking the webpage elements and the rendering modes corresponding to the webpage elements as the webpage element information. Parsing the webpage structure of the first webpage includes: parsing the webpage structure rendered by the first webpage in a preset browser interface.

Optionally, the webpage element information is transmitted to client of the shared party, and the client of the shared party renders and displays a second webpage based on the webpage element information. The following process is included: transmitting the webpage elements and the rendering modes corresponding to the webpage elements to the client of the shared party, in order that the client of the shared party renders the webpage elements by using corresponding rendering modes based on a same rendering algorithm as that in the preset browser, and displays the rendered second webpage. The above may include: serializing the webpage element information to obtain a webpage element string; transmitting the webpage element string to the client of the shared party, so that the client of the shared party de-serializes the webpage element string, and renders and displays the second webpage based on the webpage element information obtained by deserialization.

In S450, sharing of the file-for-sharing is stopped if the file-for-sharing belongs to a predetermined third sharing level, and prompt information indicating failure in sharing the file-for-sharing is generated.

The file-for-sharing belonging to the third sharing level may be a file-for-sharing in a blacklist. Exemplarily, the blacklist may be established according to at least one of: the network security of the file-for-sharing, the compatibility of the file-for-sharing with the sharing application, and the content safety of the file-for-sharing. For example, it can be monitored whether the file-for-sharing is a viral file, whether the file-for-sharing comes from an illegal webpage, whether the file-for-sharing comes from a webpage that is reported or complained by many people, or whether the file-for-sharing is a document which is restricted regarding a sharing permission and will cause infringement or generate high fee once shared.

If the file-for-sharing belongs to the predetermined third sharing level, sharing of the file-for-sharing at the sharing party and the shared party is stopped, and prompt information indicating failure in sharing the file-for-sharing is generated, so as to remind the user at the sharing party side that the sharing for the file-for-sharing is failed. It should be noted that the prompt information here is used to prompt the user that the sharing of the file-for-sharing is suspended. On this basis, query information may further be displayed for the user to select whether to continue the sharing, and the process proceeds according to the selection of the user about whether to continue sharing. The advantage lies in that when a user wants to share a file-for-sharing in the blacklist, the file still has the attribute of being sharable, so as to better meet the user's personalized needs.

In S460, the file-for-sharing is shared within a preset sharing range based on the sharing strategy.

It should be noted that the numbering of each operation step in the embodiment of the present disclosure is only used to distinguish among the technical features, but not to limit the execution order. The execution order of the technical features depends on the technical solution itself. For example, although S430, S440, and S450 are numbered sequentially in the present embodiment, they are not executed sequentially, and the execution condition of the technical feature determines which technical feature is to be executed.

In the technical solution of the embodiments of the present disclosure, by determining the sharing level to which the file-for-sharing belongs, the sharing strategy corresponding to the sharing level to which the file-for-sharing belongs is executed. By invoking the browser embedded in the interactive interface of each of the sharing party and the shared party, the file-for-sharing may be presented in the window of the browser, which can reduce the encoding and decoding operations of the video stream and greatly reduce the pressure on the bandwidth. Moreover, the content viewed by each of the sharing party and the shared party is opened through the local browser and has higher security. Alternatively, by parsing the webpage element information of the first webpage that requests to be shared and transmitting the webpage element information to the shared party, the shared party can render and display the second webpage based on the webpage element information, which can solve the technical problem that the displayed content of the file-for-sharing on the interface of the shared party may be different from the content displayed by the sharing party, and realize the sharing of the file-for-sharing in the same visual field. Alternatively, sharing of the file-for-sharing can be stopped and the prompt message indicating failure in sharing the file-for-sharing can be generated to inform the user at the sharing party side. The present technical solution is especially applicable for a scenario in which sharing of the file preset as risky is rejected, and the security of information sharing can be fully guaranteed. The sharing strategy can be configured for the file-for-sharing based on the attribute information of the file-for-sharing, so as to improve the information interaction experience of users.

Embodiment 5

Figure 5:
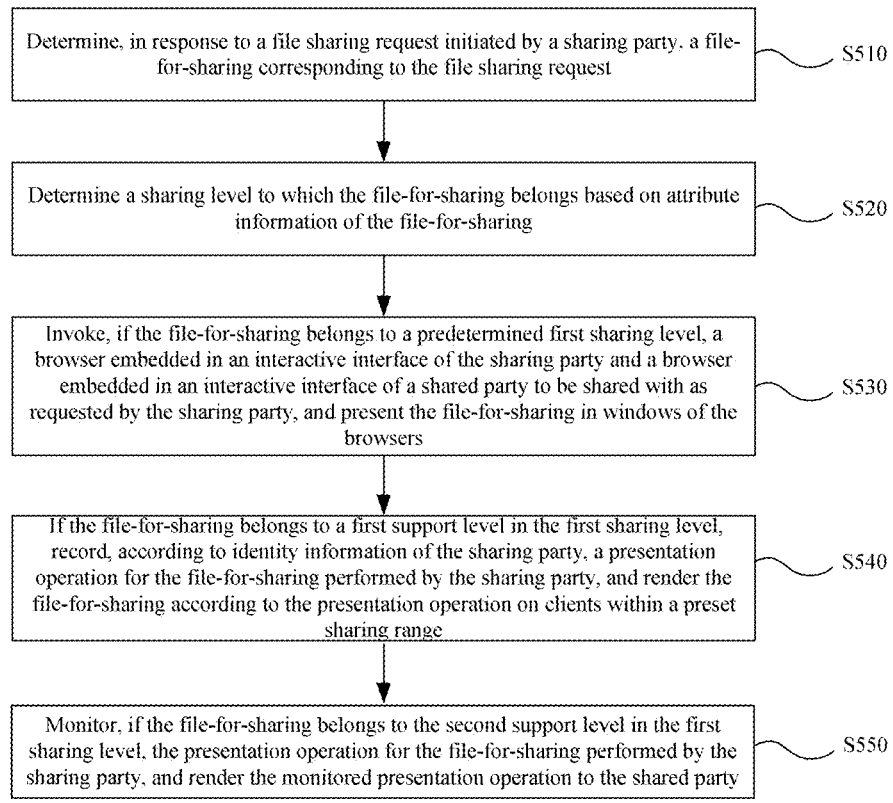
FIG. 5 is a schematic flowchart illustrating a method for sharing information according to Embodiment 5 of the present disclosure.

FIG. 5 is a schematic flowchart illustrating a method for sharing information according to Embodiment 5 of the present disclosure. This embodiment can be combined with any optional solution in the foregoing embodiments. In the present embodiment, optionally, the method for sharing information may further include: if the file-for-sharing belongs to a first support level in the first sharing level, recording, according to identity information of the sharing party, a presentation operation for the file-for-sharing performed by the sharing party, and rendering the file-for-sharing according to the presentation operation on clients within the preset sharing range. It can be understood that, although recording the presentation operation for the file-for-sharing performed by the sharing party is described here, it is illustrative. In actual applications, the server may first determine a presenting client for presenting the file-for-sharing, so as to render the file-for-sharing presented to the clients within the preset sharing range based on the presentation operation.

In the present embodiment, optionally, the method for sharing information may further include: if the file-for-sharing belongs to a second support level in the first sharing level, monitoring the presentation operation for the file-for-sharing performed by the sharing party, and rendering the monitored presentation operation to the shared party.

As shown in FIG. 5, the method according to the present embodiment may specifically include S510 to S550.

In S510, in response to a file sharing request initiated by a sharing party, a file-for-sharing corresponding to the file sharing request is determined.

In S520, a sharing level to which the file-for-sharing belongs is determined according to attribute information of the file-for-sharing.

In S530, if the file-for-sharing belongs to a predetermined first sharing level, a browser embedded in an interactive interface of the sharing party and a browser embedded in an interactive interface of a shared party which is requested to be shared with by the sharing party, are invoked, and the file-for-sharing is presented in windows of the browsers.

In S540, if the file-for-sharing belongs to a first support level in the first sharing level, a presentation operation for the file-for-sharing performed by the sharing party is recorded according to identity information of the sharing party, and the file-for-sharing is rendered according to the presentation operation on clients within a preset sharing range.

Optionally, the presentation operation includes the content of the shared document that is displayed in a sharing window of the shared client, presentation location in the shared document, or a sharing operation performed at the presentation location.

If the file-for-sharing belongs to the first support level in the first sharing level, the identity information of the sharing party may be sent to a second server through a first server, in order that the second server records the presentation operation for the file-for-sharing performed by the sharing party according to the identity information; the presentation operation for the file-for-sharing performed by the sharing party is received by the first server from the second server, and the file-for-sharing is rendered according to the presentation operation on the clients within the preset sharing range.

In the embodiment of the present disclosure, the first server may be a multimedia conference server. The first server may be configured to determine the sharing party and the shared party within the preset sharing range, the file-for-sharing and other related information. The first server may further synchronize the file-for-sharing and the presentation operation for the file-for-sharing performed by the sharing party to the shared party within the preset sharing range.

Optionally, before the second server records the presentation operation for the file-for-sharing performed by the sharing party according to the identity information, the method may further include: upon receiving the sharing request for the file-for-sharing, the first server notifies the file-for-sharing to the second server. The notifying the file-for-sharing to the second server may be implemented as sending information about the way to acquire the file-for-sharing to the second server. For example, a uniform resource locator corresponding to the file-for-sharing may be sent to the second server.

In the embodiment of the present disclosure, the presentation operation for the file-for-sharing performed by the sharing party may be recorded by the second server. The second server may be a DOCS server. It should be noted that the presenter participating in the sharing of the file-for-sharing may be changed, and the second server is mainly used to record the presentation operation performed by the presenter on the file-for-sharing, that is, the presentation operation required to be shared.

According to the present technical solution, the first server and the second server can interact with each other through connection between the first server and the second server. The first server sends identity information of the sharing party to the second server, and the second server records presentation operation for the file-for-sharing performed by the sharing party. Hence, information interaction is smoother in a simple and effective way, which greatly improves the information interaction experience.

Exemplarily, if it is monitored that the file-for-sharing is natively supported by a sharing application, it is determined that the file-for-sharing belongs to the first support level in the first sharing level. Alternatively, if it is monitored that the file-for-sharing is highly supported or deeply cooperated by the server corresponding to the sharing application, it is determined that the file-for-sharing belongs to the first support level in the first sharing level.

In S550, if the file-for-sharing belongs to the second support level in the first sharing level, the presentation operation for the file-for-sharing performed by the sharing party is monitored, and the monitored presentation operation is rendered to the shared party.

For the file-for-sharing belonging to the second support level, the presentation operation for the file-for-sharing performed by the sharing party may be collected by means of buried point analysis. The presentation operation for the file-for-sharing performed by the sharing party may be monitored with a preset monitoring program.

Monitoring the presentation operation for the file-for-sharing performed by the sharing party may include: monitoring, with a preset monitoring program, a preset monitored element in the file-for-sharing and a presentation operation performed by the sharing party on the monitored element. The monitored element includes, but not limited to, position information of a scroll bar of a sharing interface and/or position information of an operation input device or the like. For example, the monitored element may further include edit boxes of webpages and/or images. It should be noted that, in the technical solution of the embodiment of the present disclosure, the monitored element may be set according to actual needs, and the monitoring program may be set according to the element to be monitored.

If the file-for-sharing belongs to a second support level in the first sharing level, the presentation operation for the file-for-sharing performed by the sharing party may be monitored with the preset monitoring program, and the monitored presentation operation is notified to a server for synchronizing the presentation operation, which corresponds to the sharing application. Then the monitored presentation operation is rendered to the shared party by the server for synchronizing the presentation operation, which corresponds to the sharing application.

Alternatively, the monitoring program may be omitted, and a server that collects the presentation operation for the file-for-sharing (referred to as a collecting server) is connected to a server for synchronizing the presentation operation (referred to as a synchronizing server), which corresponds to the sharing application. The collected presentation operation for the file-for-sharing is notified to the synchronizing server by the collecting server, and then the presentation operation for the file-for-sharing performed by the sharing party is rendered to the shared party by the synchronizing server.

In the embodiment of the present disclosure, optionally, a support strength in which a sharing application supports for the file-for-sharing with the first support level is greater than a support strength in which the sharing application supports for the file-for-sharing with the second support level, where the support strength is determined based on a manner and/or a range in which the presentation operation for the file-for-sharing is collected. The collection manner includes a server that performs data collection and/or collection means used when collecting data. Exemplarily, the collection manner of the presentation operation for the file-for-sharing may include at least one of collecting the server of the presentation operation for the file-for-sharing, whether a monitor program is required to be set in advance or the like. Optionally, a collection range includes which part of the presentation operation is collected, in other words, the range or proportion of the collected content relative to all the presentation operations. For example, the collection range may include collecting all or part of the presentation operations performed by the user of the sharing party on the file-for-sharing.

Exemplarily, the first support level may be understood as a type in which a sharing server (such as the aforementioned second server) actively collects the presentation operation for the file-for-sharing performed by the sharing party, and pushes the presentation operation to a local server (such as the aforementioned first server). The second support level is a type in which the local server needs to perform monitoring to obtain the presentation operation for the file-for-sharing performed by the sharing party.

Exemplarily, the sharing application includes at least one of a multimedia conference application, an instant messaging application, a live video broadcast application, and a group chat interactive application.

It should be noted that "first", "second", and "third" in the embodiments of the present disclosure are only used to distinguish the following nouns, regardless of the order, do not form limitation to the nouns, and can be replaced by other identifier such as letters, symbols or numbers.

In the technical solution of the embodiment of the present disclosure, further differentiation of the sharing strategy for the file-for-sharing is achieved by determining the support level in the first sharing level to which the file-for-sharing belongs. For the file-for-sharing in the first support level, the presentation operation for the file-for-sharing performed by the sharing party is directly recorded according to the identity information of the sharing party, such that the presentation operation can be synchronized to the shared party quickly and completely, which can achieve clearer and smoother content display than the method of screen sharing. For the file-for-sharing with the second support level, the presentation operation for the file-for-sharing performed by the sharing party is monitored, and the monitored presentation operation is shared, therefore the presentation operation is shared in a targeted manner. That is, the matching degree between the file attributes and the sharing strategy is fully considered, and the invoking of shared resources is optimized while taking into account the smoothness and clarity of sharing the file-for-sharing.

Embodiment 6

Figure 6:
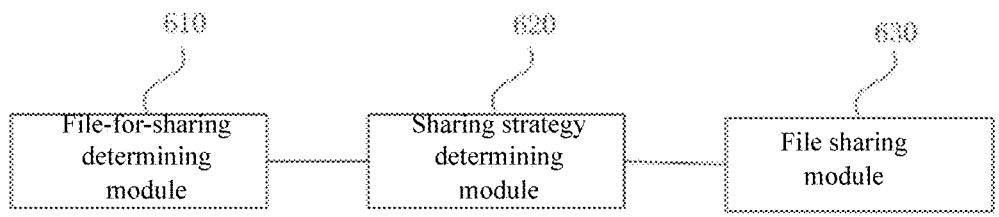
FIG. 6 is a schematic diagram illustrating the structure of an apparatus for sharing information according to Embodiment 6 of the present disclosure.

FIG. 6 is a schematic diagram illustrating the structure of an apparatus for sharing information according to Embodiment 6 of the present disclosure. As shown in FIG. 6, the apparatus for sharing information includes: a file-for-sharing determining module 610, a sharing strategy determining module 620 and a file sharing module 630. The file-for-sharing determining module 610 is configured to determine, in response to a file sharing request initiated by a sharing party, a file-for-sharing corresponding to the file sharing request. The sharing strategy determining module 620 is configured to determine a sharing strategy for the file-for-sharing based on attribute information of the file-for-sharing. The file sharing module 630 is configured to share, based on the sharing strategy, the file-for-sharing within a preset sharing range.

In the technical solution of the embodiments of the present disclosure, the sharing strategy for the file-for-sharing is determined based on the attribute information of the file-for-sharing, thus the difference between files-for-sharing is fully considered. The files-for-sharing are shared in a personalized manner based on the attribute information of the files-for-sharing. The sharing strategy matches well with the file-for-sharing, so that the file-for-sharing can be shared through the sharing strategy that matches with the attribute information of the file-for-sharing, so as to solve problems such as unsmooth and unclear display of shared screen caused by sharing all the files-for-sharing through a same sharing method in conventional technologies, thus realizing smooth sharing of the file-for-sharing and improving the user experience in information sharing.

On the basis of the technical solutions of the embodiments of the present disclosure, the sharing strategy determining module may be configured to:
  determine a sharing level to which the file-for-sharing belongs based on the attribute information of the file-for-sharing, and determine the sharing strategy for the file-for-sharing based on the sharing level, where the attribute information includes a storage address.

On the basis of the technical solutions of the embodiments of the present disclosure, the sharing strategy determining module may be configured to:
  parse the storage address of the file-for-sharing; and determine the sharing level to which the file-for-sharing belongs based on the storage address if the storage address is a cloud address provided by a third-party server.

On the basis of the technical solutions of the embodiments of the present disclosure, the sharing strategy determining module may be configured to:
  if the file-for-sharing belongs to a predetermined first sharing level, invoke a browser embedded in an interactive interface of the sharing party and a browser embedded in an interactive interface of a shared party to be shared with as requested by the sharing party, and present the file-for-sharing in windows of the browsers.

On the basis of the technical solutions of the embodiments of the present disclosure, optionally, the file-for-sharing belonging to the first sharing level has an attribute of being sharable, and a server carrying the file-for-sharing belonging to the first sharing level has a cooperative ability.

On the basis of the technical solutions of the embodiments of the present disclosure, the apparatus for sharing information may further include:
  a presentation operation sharing module, configured to record, if the file-for-sharing belongs to a first support level in the first sharing level, a presentation operation for the file-for-sharing performed by the sharing party according to identity information of the sharing party, and render the file-for-sharing according to the presentation operation on clients within the preset sharing range.

On the basis of the technical solutions of the embodiments of the present disclosure, the presentation operation sharing module may include a presentation operation recording unit and a presentation operation rendering unit. The presentation operation recording unit is configured to send the identity information of the sharing party to a second server through a first server, in order that the second server records, according to the identity information, the presentation operation for the file-for-sharing performed by the sharing party. The presentation operation rendering unit is configured to receive, from the second server through the first server, the presentation operation for the file-for-sharing performed by the sharing party, and render the file-for-sharing according to the presentation operation on the clients within the preset sharing range.

On the basis of the technical solutions of the embodiments of the present disclosure, the apparatus for sharing information may further include:
  a presentation operation monitoring module, configured to monitor, if the file-for-sharing belongs to a second support level in the first sharing level, the presentation operation for the file-for-sharing performed by the sharing party, and render the monitored presentation operation to the shared party.

On the basis of the technical solutions of the embodiments of the present disclosure, the presentation operation monitoring module may be configured to:
  monitor, with a preset monitoring program, a preset monitored element in the file-for-sharing and a presentation operation performed by the sharing party on the monitored element.

On the basis of the technical solutions of the embodiments of the present disclosure, exemplarily, the monitored element includes position information of a scroll bar of a sharing interface and/or position information of an operation input device.

On the basis of the technical solutions of the embodiments of the present disclosure, optionally, a support strength in which a sharing application supports for the file-for-sharing with the first support level is greater than a support strength in which the sharing application supports for the file-for-sharing with the second support level, where the support strength is determined based on a manner and/or a range in which the presentation operation for the file-for-sharing is collected.

On the basis of the technical solutions of the embodiments of the present disclosure, exemplarily, the sharing application includes at least one of a multimedia conference application, an instant messaging application, a live video broadcast application and a group chat interactive application.

On the basis of the technical solutions of the embodiments of the present disclosure, the file-for-sharing may include a webpage;

Accordingly, the sharing strategy determining module may be configured to:

parse, if the file-for-sharing belongs to a predetermined second sharing level, webpage element information of a first webpage to be shared as requested by the file sharing request, and transmit the webpage element information to the shared party, in order that the shared party renders and displays a second webpage based on the webpage element information.

On the basis of the technical solutions of the embodiments of the present disclosure, optionally, the file-for-sharing belonging to the second sharing level has an attribute of being sharable, and a server carrying the file-for-sharing belonging to the second sharing level has no cooperative ability.

On the basis of the technical solutions of the embodiments of the present disclosure, the sharing strategy determining module may be configured to:

stop sharing of the file-for-sharing if the file-for-sharing belongs to a predetermined third sharing level, and generate prompt information indicating failure in sharing the file-for-sharing.

On the basis of the technical solutions of the embodiments of the present disclosure, the sharing strategy determining module may be configured to:

parse a storage address of the file-for-sharing; and share the file-for-sharing within the preset sharing range by way of screen sharing if the storage address is a local address of the sharing party.

The apparatus for sharing information according to the embodiment of the present disclosure can execute the method for sharing information according to any embodiment of the present disclosure, and has functional modules and advantageous effects corresponding to executing the method.

It should be noted that the division of the units and the modules in the above apparatus is merely based on logical functions, and is limited to the above description, as long as the corresponding functions can be realized. In addition, the terms used for identifying the functional units are only to distinguish among the different units, and are not intended to limit the scope of protection of the embodiments of the present disclosure.

Embodiment 7

Hereinafter reference is made to FIG. 7 which shows a schematic structural diagram of an electronic device (for example, the terminal device or server in FIG. 6) 700 suitable for implementing the embodiments of the present disclosure. The terminal device in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 7 is exemplary, and is not intended to limit the function and usage scope of the embodiments of the present disclosure.

Figure 7:
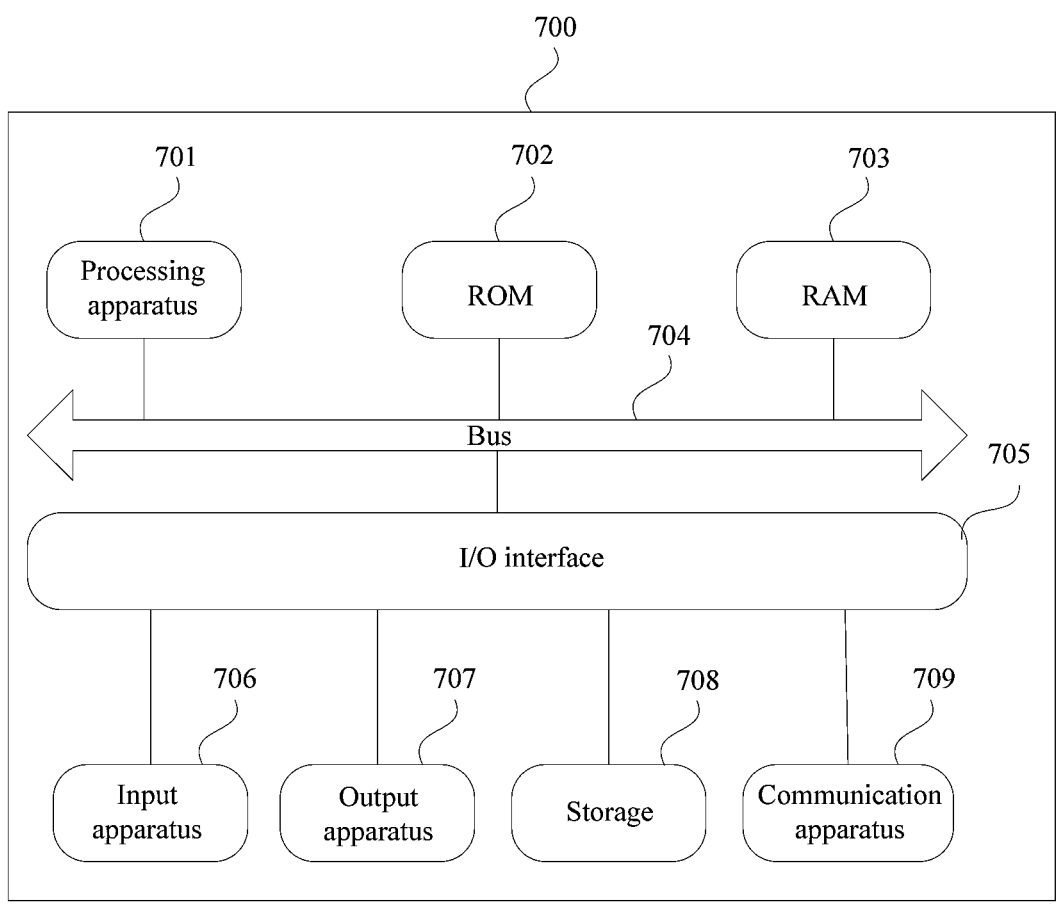
FIG. 7 is a schematic diagram illustrating the structure of an electronic device according to Embodiment 7 of the present disclosure.

As shown in FIG. 7, the electronic device 700 may include a processing apparatus (such as a central processor and a graphic processor) 701. The processing apparatus may perform various appropriate actions and processing based on programs stored in a read-only memory (ROM) 702 or programs uploaded from a storage apparatus 708 to a random access memory (RAM) 703. Various programs and data required for operations of the electronic device 700 are also stored in the RAM 703. The processing apparatus 701, the ROM 702 and the RAM 703 are connected to each other through the bus 704. An input/output (I/O) interface 705 is also connected to the bus 704.

Generally, the following apparatuses may be connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device 700 to communicate with other device in a wired or wireless manner to exchange data. Although FIG. 7 shows the electronic device 700 provided with various apparatuses, it should be understood that not all shown apparatuses are required to be implemented or included. Alternatively, more or less apparatuses may be implemented or included.

According to the embodiments of the present disclosure, a process described with reference to the flowchart above may particularly be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

The electronic device according to the embodiment of the present disclosure has a same invention concept as the method for sharing information according to the foregoing embodiments. For the technical details not described in detail in this embodiment, reference may be made to the foregoing embodiments, and the present embodiment has the same advantageous effects as the foregoing embodiments.

Embodiment 8

A computer storage medium having a computer program stored thereon is provided according to the embodiment of the present disclosure. The program, when being executed by a processor, implements the method for sharing information according to the foregoing embodiments.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed in the further, and may connect with digital data communication in any form or carried in any medium (for example, a communication network). Examples of the communication network include a local area network (LAN), a wide area network (WAN), Internet, and an end-to-end network (such as, ad hoc end-to-end network), and any currently known or future developed network.

The computer readable storage medium may be included in the electronic device, or may stand alone without being assembled into the electronic device.

The computer readable medium carries one or more programs. The one or more programs, when executed by the electronic device, enable the electronic device to perform the following operations:
  determining, in response to a file sharing request initiated by a sharing party, a file-for-sharing corresponding to the file sharing request;
  determining a sharing strategy for the file-for-sharing based on attribute information of the file-for-sharing; and
  sharing, based on the sharing strategy, the file-for-sharing within a preset sharing range.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The units mentioned in the description of the embodiments of the present disclosure may be implemented by means of software or otherwise by means of hardware. A name of the units/modules does not constitute a limitation to the units/modules in some case. For example, a target video broadcasting module may be described as "a video broadcasting module".

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It in the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a method for sharing information is provided according to Example 1. The method includes:
  determining, in response to a file sharing request initiated by a sharing party, a file-for-sharing corresponding to the file sharing request;

determining a sharing strategy for the file-for-sharing based on attribute information of the file-for-sharing; and sharing, based on the sharing strategy, the file-for-sharing within a preset sharing range.

According to one or more embodiments of the present disclosure, a method for sharing information is provided according to Example 2. The method further includes:

optionally, the determining a sharing strategy for the file-for-sharing based on attribute information of the file-for-sharing, includes:

determining a sharing level to which the file-for-sharing belongs based on the attribute information of the file-for-sharing, and determining the sharing strategy for the file-for-sharing based on the sharing level, where the attribute information includes a storage address According to one or more embodiments of the present disclosure, a method for sharing information is provided according to Example 3. The method further includes:

optionally, parsing the storage address of the file-for-sharing, and determining the sharing level to which the file-for-sharing belongs based on the attribute information of the file-for-sharing if the storage address is a cloud address provided by a third-party server other than a local terminal corresponding to the sharing party.

According to one or more embodiments of the present disclosure, a method for sharing information is provided according to Example 4. The method further includes:

optionally, the determining the sharing strategy for the file-for-sharing based on the sharing level includes:

if the file-for-sharing belongs to a predetermined first sharing level, invoking a browser embedded in an interactive interface of the sharing party and a browser embedded in an interactive interface of a shared party to be shared with as requested by the sharing party, and presenting the file-for-sharing in windows of the browsers.

According to one or more embodiments of the present disclosure, a method for sharing information is provided according to Example 5. The method further includes:

optionally, the file-for-sharing belonging to the first sharing level has an attribute of being sharable, and a server carrying the file-for-sharing belonging to the first sharing level has a cooperative ability.

According to one or more embodiments of the present disclosure, a method for sharing information is provided according to Example 6. The method further includes:

optionally, the file-for-sharing is determined from a uniform resource locator, and the uniform resource locator is specified by the sharing party in a sharing window and is sent to the shared party.

According to one or more embodiments of the present disclosure, a method for sharing information is provided according to Example 7. The method further includes:

optionally, if the file-for-sharing belongs to a first support level in the first sharing level, recording, according to identity information of the sharing party, a presentation operation for the file-for-sharing performed by the sharing party, and rendering the file-for-sharing according to the presentation operation on clients within the preset sharing range.

According to one or more embodiments of the present disclosure, a method for sharing information is provided according to Example 8. The method further includes:

optionally, the recording a presentation operation for the file-for-sharing performed by the sharing party according to identity information of the sharing party, and rendering the file-for-sharing according to the presentation operation on clients within a preset sharing range, includes:

sending the identity information of the sharing party to a second server through a first server, in order that the second server records, according to the identity information, the presentation operation for the file-for-sharing performed by the sharing party; and receiving from the second server, through the first server, the presentation operation for the file-for-sharing performed by the sharing party, and rendering the file-for-sharing according to the presentation operation on the clients within the preset sharing range.

According to one or more embodiments of the present disclosure, a method for sharing information is provided according to Example 9. The method further includes:

optionally, monitoring, if the file-for-sharing belongs to a second support level in the first sharing level, the presentation operation for the file-for-sharing performed by the sharing party, and rendering the monitored presentation operation to the shared party.

According to one or more embodiments of the present disclosure, a method for sharing information is provided according to Example 10. The method further includes:

optionally, the monitoring the presentation operation for the file-for-sharing performed by the sharing party includes:

monitoring, with a preset monitoring program, a preset monitored element in the file-for-sharing and a presentation operation performed by the sharing party on the monitored element.

According to one or more embodiments of the present disclosure, a method for sharing information is provided according to Example 11. The method further includes:

optionally, the monitored element includes position information of a scroll bar of a sharing interface and/or position information of an operation input device.

According to one or more embodiments of the present disclosure, a method for sharing information is provided according to Example 12. The method further includes:

optionally, a support strength in which a sharing application supports for the file-for-sharing with the first support level is greater than a support strength in which the sharing application supports for the file-for-sharing with the second support level, where the support strength is determined based on a manner and/or a range in which the presentation operation for the file-for-sharing is collected.

According to one or more embodiments of the present disclosure, a method for sharing information is provided according to Example 13. The method further includes:

optionally, the sharing application includes at least one of a multimedia conference application, an instant messaging application, a live video broadcast application and a group chat interactive application.

According to one or more embodiments of the present disclosure, a method for sharing information is provided according to Example 14. The method further includes:

optionally, the file-for-sharing includes a webpage;

the determining the sharing strategy for the file-for-sharing based on the sharing level includes:

if the file-for-sharing belongs to a predetermined second sharing level, parsing webpage element information of a first webpage to be shared as requested by the file sharing request, and transmitting the webpage element information to the shared party, in order that the shared party renders and displays a second webpage based on the webpage element information.

According to one or more embodiments of the present disclosure, a method for sharing information is provided according to Example 15. The method further includes:

optionally, the file-for-sharing belonging to the second sharing level has an attribute of being sharable, and a server carrying the file-for-sharing belonging to the second sharing level has no cooperative ability.

According to one or more embodiments of the present disclosure, a method for sharing information is provided according to Example 16. The method further includes:

optionally, the determining the sharing strategy for the file-for-sharing based on the sharing level includes:

if the file-for-sharing belongs to a predetermined third sharing level, stopping sharing the file-for-sharing, and generating prompt information indicating failure in sharing the file-for-sharing.

According to one or more embodiments of the present disclosure, a method for sharing information is provided according to Example 17. The method further includes:

optionally, the determining a sharing strategy for the file-for-sharing based on attribute information of the file-for-sharing includes:

parsing a storage address of the file-for-sharing, and sharing the file-for-sharing within the preset sharing range by way of screen sharing if the storage address is a local address of the sharing party.

According to one or more embodiments of the present disclosure, an apparatus for sharing information is provided according to Example 18. The apparatus includes:

a file-for-sharing determining module, configured to determine, in response to a file sharing request initiated by a sharing party, a file-for-sharing corresponding to the file sharing request;

a sharing strategy determining module, configured to determine a sharing strategy for the file-for-sharing based on attribute information of the file-for-sharing; and a file sharing module, configured to share, based on the sharing strategy, the file-for-sharing within a preset sharing range.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and acts described above are merely example forms of implementing the claims.

The invention claimed is:

1. A method for sharing information, comprising:
determining, in response to a file sharing request initiated by a sharing party, a file-for-sharing corresponding to the file sharing request;
determining a sharing strategy for the file-for-sharing based on attribute information of the file-for-sharing, comprising:
determining, based on the attribute information of the file-for-sharing, a sharing level to which the file-for-sharing belongs, and
determining the sharing strategy for the file-for-sharing based on the sharing level,
wherein the attribute information comprises a storage address; and
sharing, based on the sharing strategy, the file-for-sharing within a preset sharing range,
wherein the determining the sharing level to which the file-for-sharing belongs based on the attribute information of the file-for-sharing, comprises:
parsing the storage address of the file-for-sharing, and determining the sharing level to which the file-for-sharing belongs based on the storage address if the storage address is a cloud address provided by a third-party server.

2. The method according to claim 1, wherein the determining the sharing strategy for the file-for-sharing based on the sharing level comprises:
if the file-for-sharing belongs to a predetermined first sharing level, invoking a browser embedded in an interactive interface of the sharing party and a browser embedded in an interactive interface of a shared party to be shared with as requested by the sharing party, and presenting the file-for-sharing in windows of the browsers.

3. The method according to claim 2, wherein the file-for-sharing belonging to the first sharing level has an attribute of being shared, and a server carrying the file-for-sharing belonging to the first sharing level has a cooperative ability.

4. The method according to claim 2, wherein the file-for-sharing is determined based on a uniform resource locator, and the uniform resource locator is specified by the sharing party in a sharing window and is sent to the shared party through a server.

5. The method according to claim 2, further comprising:
if the file-for-sharing belongs to a first support level in the first sharing level, recording, according to identity information of the sharing party, a presentation operation for the file-for-sharing performed by the sharing party, and rendering the file-for-sharing according to the presentation operation on clients within the preset sharing range.

6. The method according to claim 5, wherein the recording a presentation operation for the file-for-sharing performed by the sharing party according to identity information of the sharing party, and rendering the file-for-sharing according to the presentation operation on clients within a preset sharing range, comprises:
sending the identity information of the sharing party to a second server through a first server, in order that the second server records, according to the identity information, the presentation operation for the file-for-sharing performed by the sharing party; and receiving from the second server, through the first server, the presentation operation for the file-for-sharing performed by the sharing party, and rendering the file-for-sharing according to the presentation operation on the clients within the preset sharing range.

7. The method according to claim 2, further comprising:
if the file-for-sharing belongs to a second support level in the first sharing level, monitoring the presentation operation for the file-for-sharing performed by the sharing party, and rendering monitored presentation operation to the shared party.

8. The method according to claim 7, wherein the monitoring the presentation operation for the file-for-sharing performed by the sharing party comprises:
monitoring, with a preset monitoring program, a preset monitored element in the file-for-sharing and a presentation operation performed by the sharing party on the monitored element.

9. The method according to claim 8, wherein the monitored element comprises position information of a scroll bar of a sharing interface and/or position information of an operation input device.

10. The method according to claim 7, wherein a support strength in which a sharing application supports for the file-for-sharing with the first support level is greater than a support strength in which the sharing application supports for the file-for-sharing with the second support level, wherein the support strength is determined based on a manner and/or a range in which the presentation operation for the file-for-sharing is collected.

11. The method according to claim 8, wherein the sharing application comprises at least one of a multimedia conference application, an instant messaging application, a live video broadcast application and a group chat interactive application.

12. The method according to claim 1, wherein the file-for-sharing comprises a webpage;
the determining the sharing strategy for the file-for-sharing based on the sharing level comprises:
if the file-for-sharing belongs to a predetermined second sharing level, parsing webpage element information of a first webpage to be shared as requested by the file sharing request, and transmitting the webpage element information to the shared party, in order that the shared party renders and displays a second webpage based on the webpage element information.

13. The method according to claim 12, wherein the file-for-sharing belonging to the second sharing level has an attribute of being shared, and a server carrying the file-for-sharing belonging to the second sharing level has no cooperative ability.

14. The method according to claim 1, wherein the determining the sharing strategy for the file-for-sharing based on the sharing level comprises:
if the file-for-sharing belongs to a predetermined third sharing level, stopping sharing of the file-for-sharing, and generating prompt information indicating failure in sharing the file-for-sharing.

15. The method according to claim 1, wherein the determining a sharing strategy for the file-for-sharing based on attribute information of the file-for-sharing comprises:

if the storage address is a local address of the sharing party, sharing the file-for-sharing within the preset sharing range by way of screen sharing.

16. An electronic device, comprising:
one or more processors;
a storage configured to store one or more programs, wherein
when the one or more programs are executed by the one or more processors, the one or more processors implement:
determining, in response to a file sharing request initiated by a sharing party, a file-for-sharing corresponding to the file sharing request;
determining a sharing strategy for the file-for-sharing based on attribute information of the file-for-sharing, comprising:
determining, based on the attribute information of the file-for-sharing, a sharing level to which the file-for-sharing belongs, and
determining the sharing strategy for the file-for-sharing based on the sharing level,
wherein the attribute information comprises a storage address; and
sharing, based on the sharing strategy, the file-for-sharing within a preset sharing range,
wherein the determining the sharing level to which the file-for-sharing belongs based on the attribute information of the file-for-sharing, comprises:
parsing the storage address of the file-for-sharing, and
determining the sharing level to which the file-for-sharing belongs based on the storage address if the storage address is a cloud address provided by a third-party server.

17. A non-transitory storage medium having computer-executable instructions stored thereon, wherein the computer-executable instructions, when being executed by a computer processor, implement:
determining, in response to a file sharing request initiated by a sharing party, a file-for-sharing corresponding to the file sharing request;
determining a sharing strategy for the file-for-sharing based on attribute information of the file-for-sharing, comprising:
determining, based on the attribute information of the file-for-sharing, a sharing level to which the file-for-sharing belongs, and
determining the sharing strategy for the file-for-sharing based on the sharing level,
wherein the attribute information comprises a storage address; and
sharing, based on the sharing strategy, the file-for-sharing within a preset sharing range,
wherein the determining the sharing level to which the file-for-sharing belongs based on the attribute information of the file-for-sharing, comprises:
parsing the storage address of the file-for-sharing, and
determining the sharing level to which the file-for-sharing belongs based on the storage address if the storage address is a cloud address provided by a third-party server.

* * * * *